G. W. BUNGAY.
CONTROLLER FOR MECHANICAL GEAR SHIFTS.
APPLICATION FILED JAN. 5, 1914.
1,233,548.
Patented July 17, 1917.
2 SHEETS—SHEET 1.
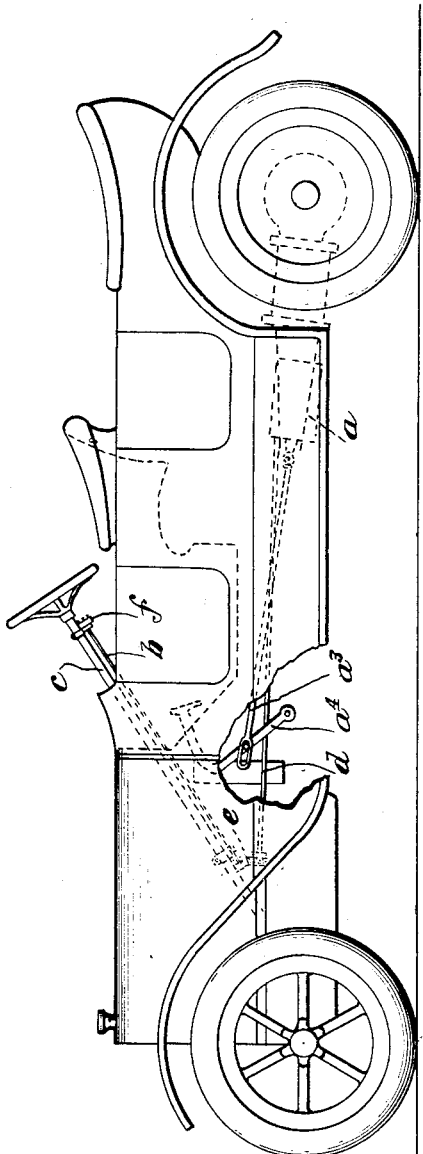
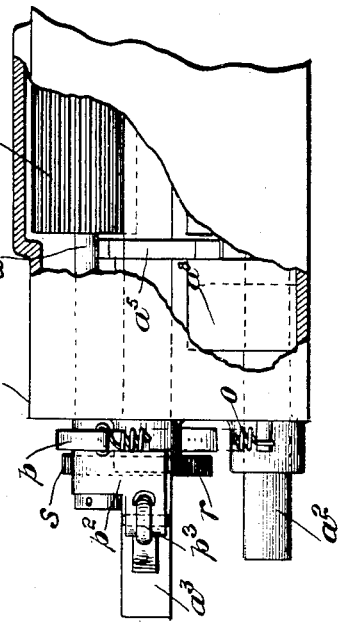
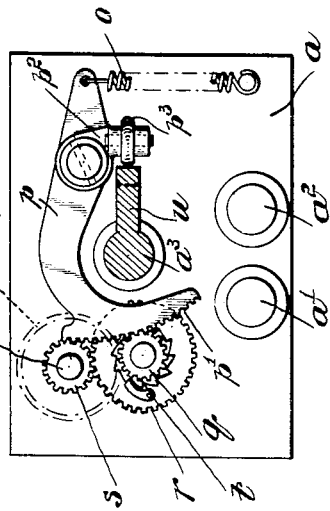
Attest:
George W. Bungay, Inventor:
by Frank P. Wentworth
his Atty.

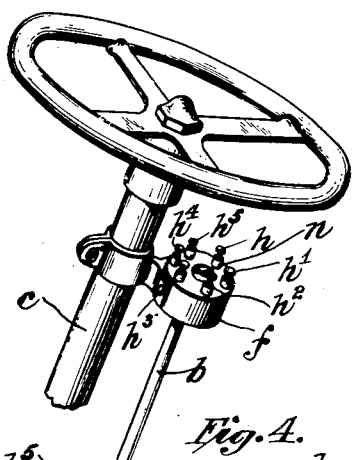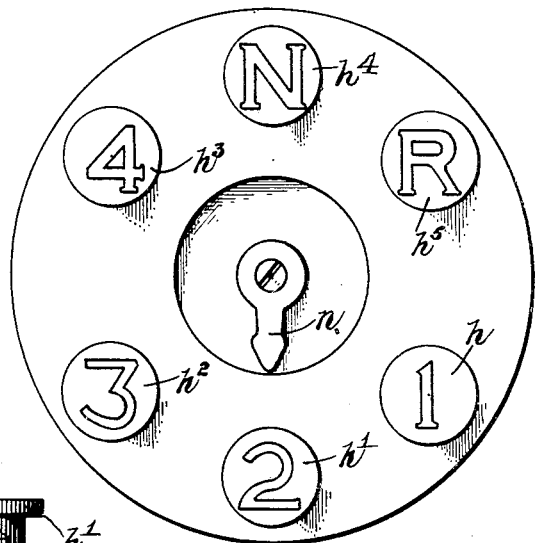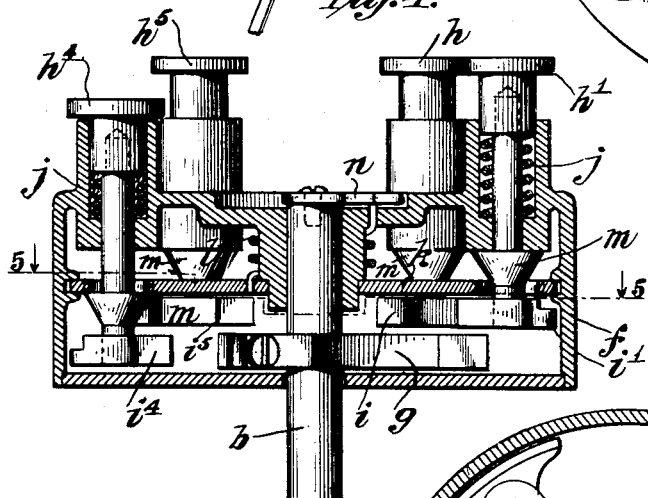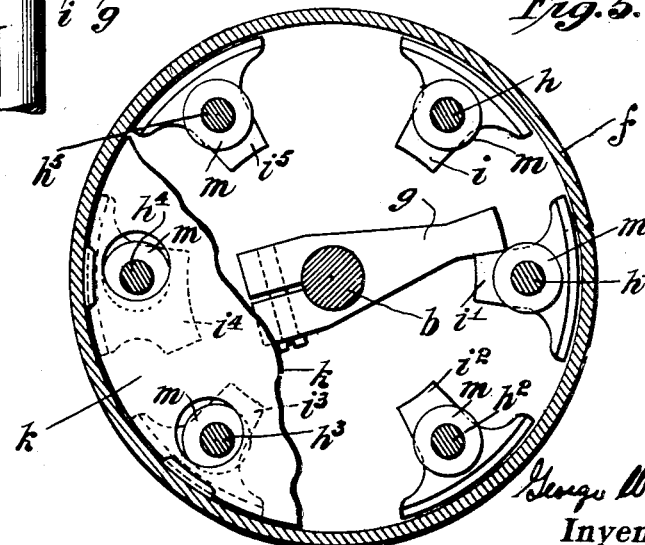

UNITED STATES PATENT OFFICE.

GEORGE W. BUNGAY, OF BROOKLYN, NEW YORK, ASSIGNOR TO BUNGAY MFG. COMPANY, A CORPORATION OF NEW YORK.

CONTROLLER FOR MECHANICAL GEAR-SHIFTS.

1,233,548.  Specification of Letters Patent.  Patented July 17, 1917.

Application filed January 5, 1914. Serial No. 810,292.

*To all whom it may concern:*

Be it known that I, GEORGE W. BUNGAY, a citizen of the United States, residing at the borough of Manhattan, in the city of New York, county of Kings, and State of New York, have invented certain new and useful Improvements in Controllers for Mechanical Gear-Shifts, of which the following is a specification, reference being had therein to the accompanying drawings, which form a part thereof.

My invention relates to controllers for mechanical gear shifts, and more particularly to a device which may be set for a predetermined degree of actuation of the gear shift mechanism, the actual operation of said mechanism being automatic.

This controller is adapted especially for use in connection with a gear shift mechanism, the setting mechanism of which is inoperative at all times excepting when the engine clutch pedal is depressed for releasing the clutch. Such a gear shift mechanism has been in actual use, but it was found that in making a quick change of speed, the clutch and the controller had to be actuated in sequence and under some conditions there was a tendency toward such an interference in the variable speed gears that the desired shifting could not be secured with reliability.

By my present invention, I am enabled to set the controller for any desired speed while the engine is running at one speed, and the actuation of the clutch pedal will simultaneously actuate the gear shifting mechanism so that the controller may actuate the setting mechanism thereof, said setting mechanism immediately coming automatically to the desired position so that the actual setting and shifting of the gear shifting mechanism is under the control of the pedal, the extent of the operation of the gear shifting mechanism being, however, determined by the controller.

My controller has the further advantage that the manual labor required to shift the gears or the setting mechanism therefor is reduced to that necessary to operate the controller, the actual movement of parts of the transmission gearing and gear shifting mechanism being accomplished automatically.

In the practice of my invention, I prefer to use a mechanism wherein the setting power is developed upon each actuation of the clutch pedal, thus insuring the presence at all times of sufficient energy to accomplish the setting of the gear shifting mechanism.

My controller embodies therein a rotary shaft and means controlled thereby for setting the gear shifting mechanism for any desired speed forward, or reverse, and in conjunction therewith, I employ automatically acting means for accomplishing the rotary movement of said shaft and settable means by which the extent of this rotary movement may be determined.

To facilitate the setting of the controller, I preferably employ a plurality of independently operative, depressible stops, any one of which may be set so as to arrest rotary movement of said shaft at a desired point, the depression of one of said stops automatically effecting the release of any other so that only one stop at a time may be depressed. I also aim to provide a power developing mechanism for actuating the setting mechanism, the energy of which will be developed by the reciprocatory movement of the main shaft of the automatic gear shifting device, the power transmission means being so constructed that it is inoperative upon the setting mechanism while the power is being developed, and becomes operative upon said mechanism prior to the actuation of said gear shift mechanism under the control of the clutch pedal. I further provide means whereby the controlling mechanism will at all times indicate the speed or direction at which the variable speed gears are set, thus permitting the operator to determine the speed at which he is running, and in case of a change of speed, the speed to which he is to change.

I also aim by my invention, as far as possible, the construction of the controller without sacrificing its strength, durability or reliability of operation.

My invention consists primarily in a controller for mechanical gear shifts, embodying therein a gear shifting mechanism controlled by the clutch pedal, and a rotary setting device therefor, said setting device being operative only when said clutch is released, in combination with a rotatable shaft, connections betwen said shaft and said setting device, means adapted to automatically and simultaneously actuate said setting device and said shaft, and differentially operative means adapted to act upon said shaft to limit the operative movement of said actuating means; and in such other novel features of construction and combination of parts as are hereinafter set forth and described, and more particularly pointed out in the claims hereto appended.

Referring to the drawings:—

Figure 1 is a side elevation of an automobile, showing my improved controller and gear shift mechanism applied thereto;

Fig. 2 is an enlarged view of the steering head, and the controller box secured in relation thereto;

Fig. 3 is a plan view of said controller box;

Fig. 4 is a vertical section of said controller box;

Fig. 5 is a section on the line 5—5 of Fig. 4;

Fig. 6 is an end view of the gear shift box, showing the actuating means for my controller; and Fig. 7 is a side elevation of said actuating means, the mechanism in said box being shown in elevation.

Like letters refer to like parts throughout the several views.

Inasmuch as the detailed construction of the gear shifting mechanism is immaterial to this invention, and as I do not intend to claim the same in this application, a specific showing thereof in the drawings, or description thereof, is not made, and will not be entered into. But as the device of this application has particular applicability to this gear shifting mechanism, and a reference to the essentials thereof will be necessary in connection with the explanation of that form of the invention shown in the accompanying drawings, a general showing of said gear shifting mechanism is made, and a general description thereof will be given.

In the accompanying drawings, $a$ indicates the gear shifting mechanism box which has mounted therein the gear shifting rods $a'$ and $a^2$, and the rod $a^3$, adapted to be connected to the clutch pedal $a^4$ of an automobile. The spring tension for actuating the gear shifting rods $a'$ $a^2$ is developed by connections between the rod $a^3$, which rod is reciprocatory, and oppositely movable slidable disks or other means for transmitting the energy of said springs to either of the rods $a'$ or $a^2$. One of said disks is shown at $a^5$.

To determine the direction and extent of movement of either rod $a'$ or $a^2$, the disks $a^5$ are rotated by means of a rotary setting member $a^6$, which may be an elongated gear rotating with a shaft $a^7$. When the clutch is released, the rods $a'$ and $a^2$ are actuated to bring the transmission gears out of mesh, and at the same time bring the disks $a^5$ out of engagement with a guide stop $a^8$, which is straddled by its disk when the said disk has been actuated to shift the speed gearing, and is engaged thereby when the controlling means is at neutral to prevent the shifting of the gears.

From this brief description, it is apparent that the essential characteristics of this form of gear shifting mechanism are the means whereby the disengagement of the transmission gears is accomplished substantially simultaneously with, or immediately following, the release of the engine clutch, the connecting disks which are held against rotation when the transmission gears are in mesh, and are free to rotate when said gears are disengaged, and a rotary setting means for said connecting disks to determine their operative effect upon the transmission gears.

These are the only characteristics which need be referred to in connection with the present invention, which relates more particularly to a mechanism by which the rotary setting device is automatically actuated, this device heretofore having been manually set. Such a gear shifting mechanism is fully shown and described in Letters Patent No. 1,193,985, granted under date of Aug. 8, 1916.

By my present invention, I provide a rotary shaft $b$ exending parallel with the steering column $c$, which shaft is connected in any desired manner as by the rod $d$, and bevel gears $e$, with the setting device or rotary gear $a^6$.

Mounted upon or otherwise secured in position in relation to the steering column $c$ is a controller box $f$ in which the upper end of the shaft $b$ is mounted. Within this box and adjacent to the bottom thereof is an arm $g$, carried by and rotatable with the shaft $b$.

Carried by the controller box $f$ is a plurality of depressible plungers $h$ $h'$ $h^2$ $h^3$ $h^4$ $h^5$ respectively carrying at the lower end thereof, and within the lower portion of the box $f$, a stop block $i$ $i'$ $i^2$ $i^3$ $i^4$ or $i^5$, adapted to be projected by the depression of its plunger into the path of the arm $g$ so as to arrest the rotary movement thereof. Each of the plungers $h$ to $h^5$ respectively is provided with an enlarged head mounted in a spring cup carried by the controller box $f$, a spring as $j$ being seated within said cup and having a normal tendency to raise said plunger and its stop.

To permit the setting of each plunger in its depressed position, means are provided as a lock plate $k$ having a plurality of openings therein through which a projection $m$ upon each of said depressible plungers is adapted to pass and by engagement with the under side thereof hold any said plunger in the depressed position.

This plate is rotatably mounted within the controller box $f$ and is acted upon by a torsion spring $l$ to permit the movement of the plate upon the passage of said projection, and its restoration to normal where it will prevent a return movement of a plunger. The projections $m$ are conical in shape, so as to present a cam surface to the plate $k$. By using a lock plate common to all said stop plungers, and by making all of the projections $m$ of the same dimensions, it will be observed that the plate $k$ will be actuated by the depression of any plunger in a manner to disengage it from any depressed plunger, and thus permit that plunger and its stop to be raised by means of its spring $j$, and prevent more than one stop being set at a time.

The various plungers are made settable by reason of this lock plate, and the reason why it is so constructed is that it is desired to set the controller for a given speed prior to the release of the engine clutch and of the setting device of the gear shifting mechanism.

The shaft $b$ projects through the controller box $f$ and upon the upper end thereof carries an indicator finger $n$ which is alined with, and will indicate the position of, the arm $g$, thus showing at a glance at what speed the transmission gears are set at any time, and the speed to which these gears will be changed with the next actuation of the gear shifting mechanism.

The actual setting of the gear shifting mechanism may be accomplished automatically by any desired mechanism becoming operative upon the release of the clutch and of the setting device of the gear shifting mechanism. I prefer to employ a spring for this purpose, which spring will be tensioned prior to each actuation of the setting device, thus avoiding any possibility of the failure of the gear shifting mechanism to be actuated to the extent indicated by the controller.

In the form of the invention shown, this automatic actuating means for the setting device of the gear shifting mechanism comprises a spring $o$ mounted upon the gear shifting box $a$, the energy of which spring is transmitted to the gear setting device $a^6$ by means of a lever $p$ carrying an oscillatory rack $p'$ mounted upon a stud carried by said box, a gear $q$ enmeshed therewith and connected with a gear $r$ in mesh with the gear $s$ mounted upon the shaft $a^7$ by means of a pawl and ratchet mechanism $t$.

The lever $p$ is provided with an arm $p^2$ carrying an anti-friction roller $p^3$ adapted to engage the cam $u$ carried by the rod $a^3$. This cam $u$ is so set that when the clutch pedal is depressed, to restore all parts of the gear shifting mechanism to a neutral position, the lever $p$ will be permitted to have oscillatory movement under its spring $o$, and when said pedal is released to actuate the gear shifting mechanism, said lever $p$ will be oscillated to tension said spring.

By this construction it will be observed that the spring is tensioned prior to each actuation of the gear setting mechanism so that when this mechanism is brought to normal, the spring will accomplish the automatic setting of the gear shifting mechanism instantly upon the parts coming to that position where they may be so set.

Each of the plungers $h$ is provided with a button indicating the various speeds or directions of drive, which will result from the depression of that plunger, one of said buttons indicating the neutral position of the gears so that if desired, the actuation of the gear shifting mechanism may be prevented, through the actuation of the control.

The operation of the herein described controller is substantially as follows:—

Assuming that the clutch pedal $a^4$ is raised so as to set the engine clutch, but that the gear shifting device and the transmission gears are set for any desired speed, the plunger indicating that speed at which the engine is running, will have been depressed. If it be desired to bring the transmission gearing to neutral while the engine is still running, and transmitting power to the driving wheels through the transmission gearing, the plunger $h^4$ will be depressed as shown in Fig. 4, interposing its stop $i^4$ in the path of the arm $g$. This depression of the plunger $h^4$, as the projection $m$ thereon passes through its opening in the plate $k$, will oscillate said plate against the tension of the spring $l$, thus releasing the previously depressed plunger, but upon the return of said plate to normal, retaining the plunger $h^4$ in the depressed position.

This actuation of the plunger $h^4$ does not in any way affect the gear shifting mechanism or its setting device, but merely determines what the subsequent actuation of this device and mechanism will be. When it is desired to actually accomplish a shifting of the gears of the transmission gearing, the pedal $a^4$ is depressed, thus restoring the disks $a^5$, which prior to that time had been held against rotation by the stops $a^8$, to their normal position where they are free to be rotated.

Immediately that the disks $a^5$ are clear of the guide stops $a^8$, the spring $o$, through the lever $p$ will rotate the shaft $a^7$, thus setting the disks $a^5$ so that upon the release of the clutch pedal, they will abut against the stops $a^8$ and thus prevent the actuation of the gear shifting rods $a'$ and $a^2$.

When the rod $a^3$ is reciprocated to bring the parts to normal, the cam $u$ thereon will pass out of engagement with the anti-friction roller $p^3$, and permit operative movement of the lever $p$, and when the pedal is permitted to rise, this cam surface will engage the said roller and tension the spring o, so that it is in tension preparatory to the next actuation of the setting device of the gear shift mechanism. When the spring has been thus tensioned, it will remain in tension until the next actuation of one of the plungers of the controller, notwithstanding the actuation of the pedal $a^3$ in setting and releasing the engine clutch.

The spring o in addition to rotating the setting gear $a^6$, will rotate the shafts $b$ $d$, and the arm $g$ carried by the latter, the engagement of the arm $g$ with the stop $i^4$ determining the extent of this rotary movement, or controlling the setting of the device. The indicator finger $n$ being parallel with and traveling with the arm $g$ will indicate the point at which this arm comes to rest, or the speed or direction at which the gears are set. If it be desired to again change the speed, or the direction of the vehicle, any one of the plungers $h$ to $h^5$ may be depressed, the depression of one plunger resulting in the release of the previously depressed plunger, so as to leave clearance between the arm $g$ and the stop of the depressed plunger, and thus determining the extent of the next shifting movement of the transmission gears.

After the depression of a plunger, there is clearly indicated upon the controller box, the speed or direction at which the transmission gears are set, and the next speed to which they will go upon the actuation of the clutch pedal. The pawl and ratchet mechanism $t$ will prevent the development of power in the spring o with resultant movement of the gear $a^6$.

It will be observed from the foregoing description, that the setting of the gear shifting mechanism is entirely automatic, the degree of the movement in setting same being determined by the controller. This condition permits the controller to be set for any desired direction or speed while the vehicle is running at a different speed, avoids any necessity for accuracy in the timing of the actuation of the controlling pedal, and the setting mechanism, and permits the setting of the gear shifting mechanism without the exercise of any substantial degree of energy.

It also permits the operator to determine the speed at which he is running, and the speed to which he is about to shift the transmission gearing. This advance setting of the controlling mechanism results from the locking of the setting device of the gear shifting mechanism at all times while the clutch is set, and prevents any possibility of a disarrangement or breakage of the controller mechanism.

It is not my intention to limit the invention to the precise details of construction shown in the drawings, it being apparent that such may be varied without departing from the spirit and scope of the invention.

I believe it to be broadly new to provide a controller having the characteristics above specified, and it is not my intention to restrict myself to the particular mechanism shown or the particular manner of developing the power for actuating the setting device. The essentials of my invention are means whereby a subsequent actuation of the setting device may be determined by the controller, and the actuating of the setting device will be automatically accomplished only after all of the parts of the gear shifting mechanism are at normal and the gears of the transmission gearing are disengaged, and I intend to claim such broadly.

Having described my invention, what I claim as new and desire to have protected by Letters Patent, is:—

1. A controller for mechanical gear shifts embodying therein an engine clutch, a clutch pedal operatively connected therewith, a gear shift mechanism controlled by said clutch pedal, and a rotary setting device therefor, said setting device being inoperative when said clutch is set, in combination with a rotatable shaft, connections between said shaft and said setting device, means adapted to automatically and simultaneously actuate said setting device and said shaft, and differentially operative means adapted to act upon said shaft to limit the operative movement of said actuating means.

2. A controller for mechanical gear shifts embodying therein an engine clutch, a clutch pedal operatively connected therewith, a gear shift mechanism controlled by said clutch pedal, and a rotary setting device therefor, said setting device being inoperative when said clutch is set, in combination with a rotatable shaft, connections between said shaft and said setting device, means adapted to automatically and simultaneously actuate said setting device and said shaft, a plurality of independently settable stops about said shaft, and an arm carried by said shaft adapted to engage any of said stops to limit the operative movement of said actuating means.

3. A controller for mechanical gear shifts embodying therein an engine clutch, a clutch pedal operatively connected therewith, a gear shift mechanism controlled by said clutch pedal, and a rotary setting device therefor, said setting device being inoperative when said clutch is set, in combination with a rotatable shaft, connections between said shaft and said setting device, means adapted to automatically and simultaneously actuate said setting device and said shaft, a plurality of independently settable stops about said shaft, an arm carried by said shaft adapted to engage any of said stops to limit the operative movement of said actuating means, and means whereby the setting of one stop will automatically permit the previously set stop to assume an inoperative position relative to said arm.

5. A controller for mechanical gear shifts embodying therein an engine clutch, a clutch pedal operatively connected therewith, a gear shift mechanism controlled by said clutch pedal, and a rotary setting device therefor, said setting device being inoperative when said clutch is set, in combination with a rotatable shaft, connections between said shaft and said setting device, means adapted to automatically and simultaneously actuate said setting device and said shaft, an arm carried by and movable with said shaft, a plurality of independently movable spring supported plungers, a stop controlled by each of said plungers, adapted, with the depression of said plunger, to be projected into the path of said arm, a lock plate common to all of said plungers, and means carried by each said plunger coöperating with said lock plate, whereby the movement of any plunger will actuate said plate to release the previously set plunger, and after each said plunger has been moved, it will be held in the set position.

5. A controller for mechanical gear shifts embodying therein an engine clutch, a clutch pedal operatively connected therewith, a gear shift mechanism controlled by said clutch pedal, and a rotary setting device therefor, said setting device being inoperative when said clutch is set, in combination with a rotatable shaft, connections between said shaft and said setting device, means adapted to automatically and simultaneously actuate said setting device and said shaft, differentially operative means adapted to act upon said shaft to limit the operative movement of said actuating means, and means carried by said shaft whereby the speed for which the setting device is set is indicated prior to the actuation thereof.

6. A controller for mechanical gear shifts embodying therein a gear shifting mechanism and a setting device, in combination with a plurality of independently operative devices for determining the operative movement of said setting device, means for automatically actuating said setting device, and means whereby the operative interval of said last named means is under the control of the controlling means for said gear shifting mechanism.

7. A controller for mechanical gear shifts embodying therein a gear shifting mechanism and a setting device, in combination with a plurality of independently operative devices for determining the operative movement of said setting device, means for automatically actuating said setting device, means whereby the operative interval of said last named means is under the control of the controlling means for said gear shifting mechanism, and means independent of said independently operative devices, whereby the position of the setting device will be indicated after the actuation of one of said independently operative devices, and prior to the actuation of the setting device in accordance therewith.

8. A controller for mechanical gear shifts embodying therein an engine clutch, a clutch pedal operatively connected therewith, a gear shift mechanism controlled by said clutch pedal, and a rotary setting device therefor, said setting device being inoperative when said clutch is set, in combination with a rotatable shaft, connections between said shaft and said setting device, a spring adapted to automatically and simultaneously actuate said setting device and said shaft, means whereby said spring will be placed in tension prior to each actuation of said rotatable shaft, and differentially operative means adapted to limit the operative effect of said spring upon said shaft.

9. A controller for mechanical gear shifts, embodying therein an engine clutch, a clutch pedal operatively connected therewith, a gear shift mechanism, controlling means connecting said mechanism with said clutch pedal, and a rotary setting device therefor, said setting device being inoperative when the clutch is set, in combination with a rotatable shaft, connections between said shaft and said setting device, an oscillatory lever, means carried by said controlling means whereby said lever will be positively oscillated when said controlling means is operative to permit the shifting of the gears, a spring, one end of which is connected to said lever, whereby said spring will be tensioned when said lever is positively oscillated under said controlling means, a rack carried by said lever, gearing whereby movement may be imparted by said lever to said device, including therein a pawl and ratchet mechanism to permit movement of said lever to effect the tensioning of said spring without affecting said setting device, and differentially operative means adapted to limit the operative effect of said spring upon said setting device and said shaft.

In witness whereof, I have hereunto affixed my signature, in the presence of two subscribing witnesses, this 31st day of December, 1913.

GEORGE W. BUNGAY.

Witnesses:
 CLARICE FRANCE,
 EUGENE WERING.